No. 692,793.
J. C. LOTTERHAND.
TYPE WRITER.
(Application filed Aug. 7, 1897.)
(No Model.)
Patented Feb. 4, 1902.
5 Sheets—Sheet 2.
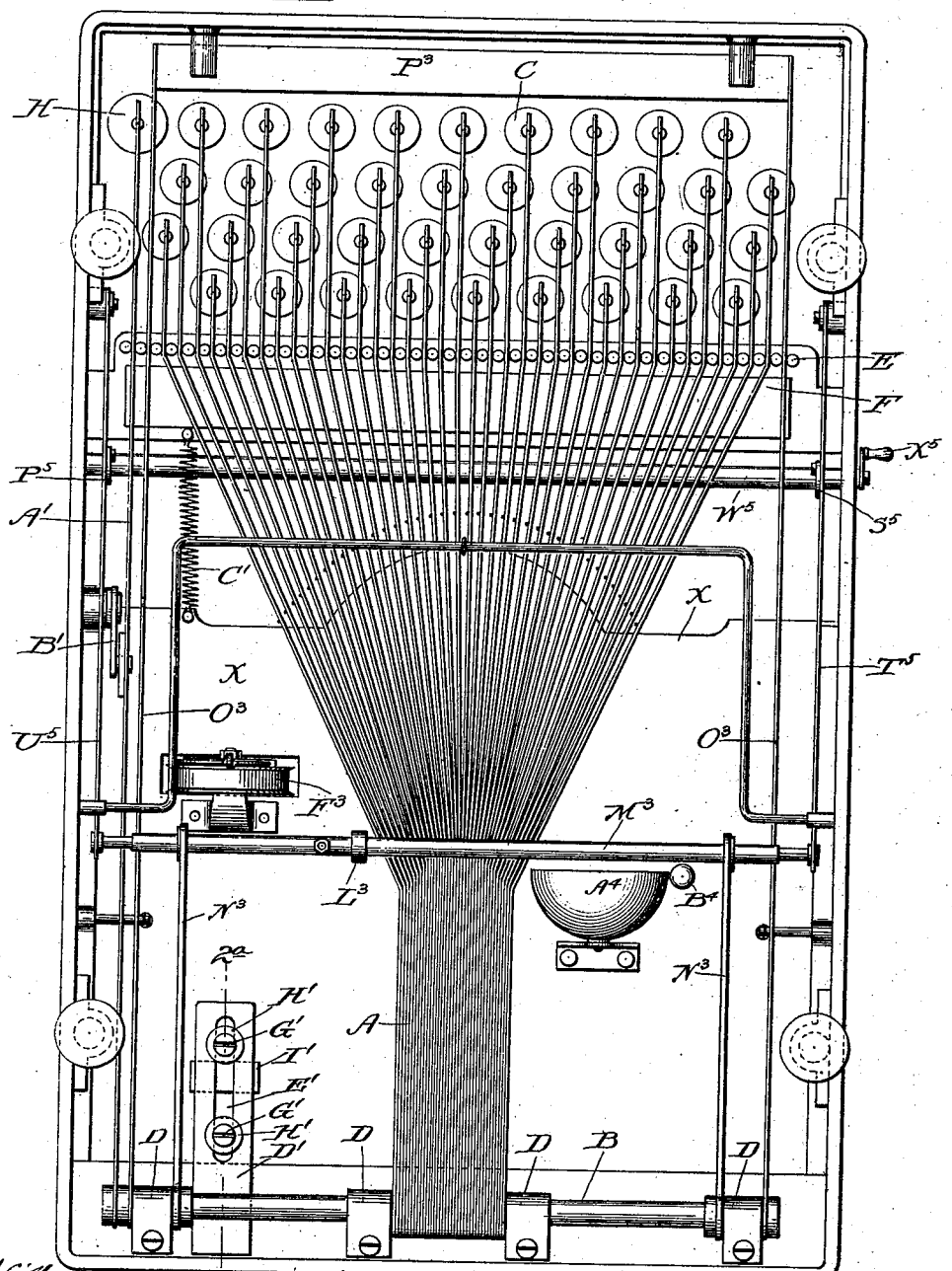

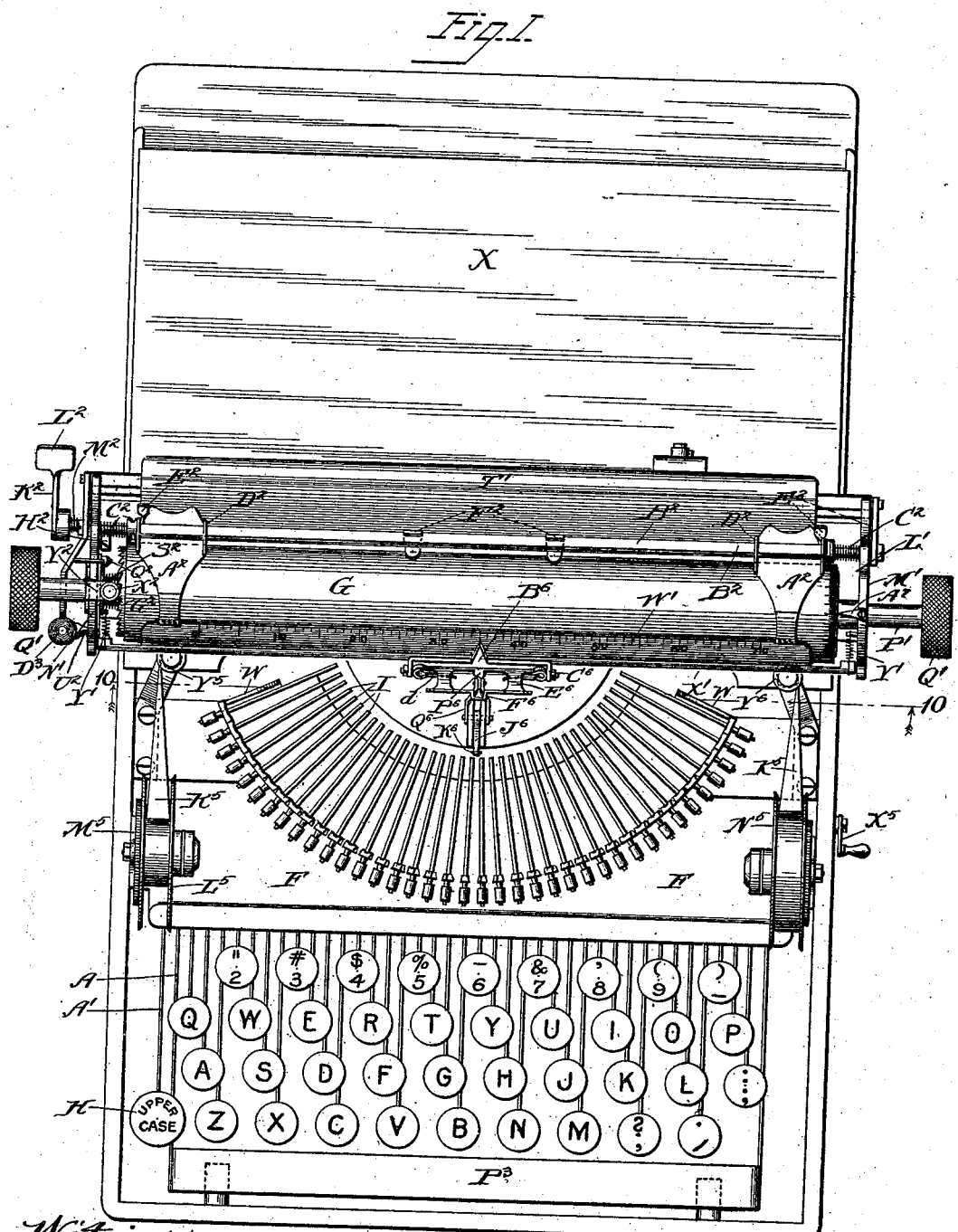

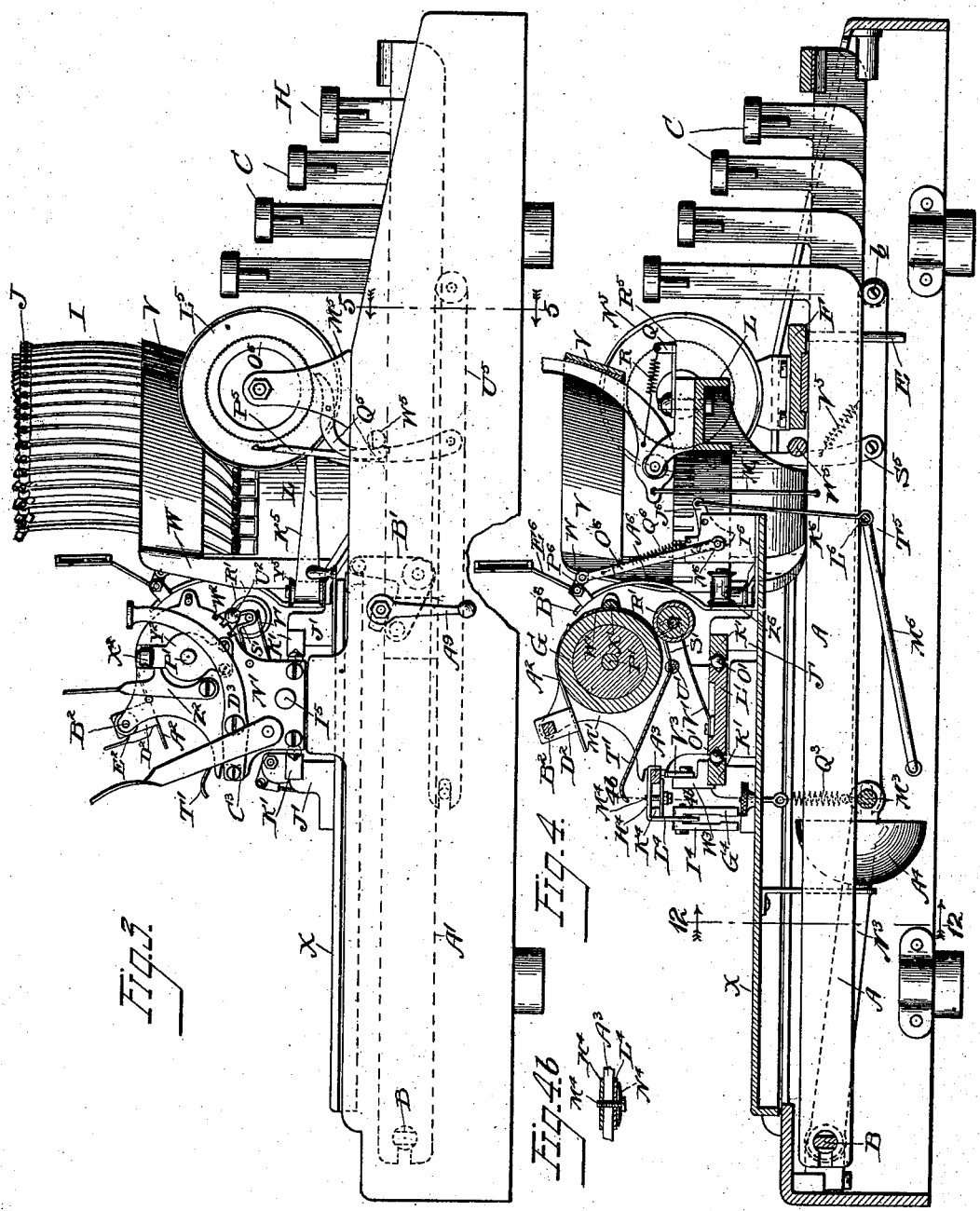

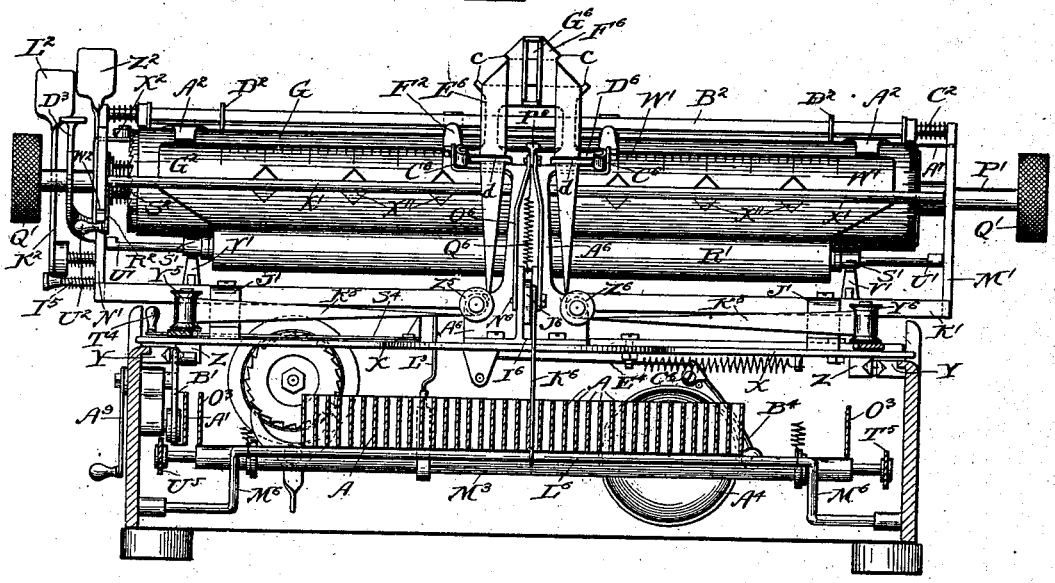

No. 692,793. Patented Feb. 4, 1902.
J. C. LOTTERHAND.
TYPE WRITER.
(Application filed Aug. 7, 1897.)
(No Model.) 5 Sheets—Sheet 5.
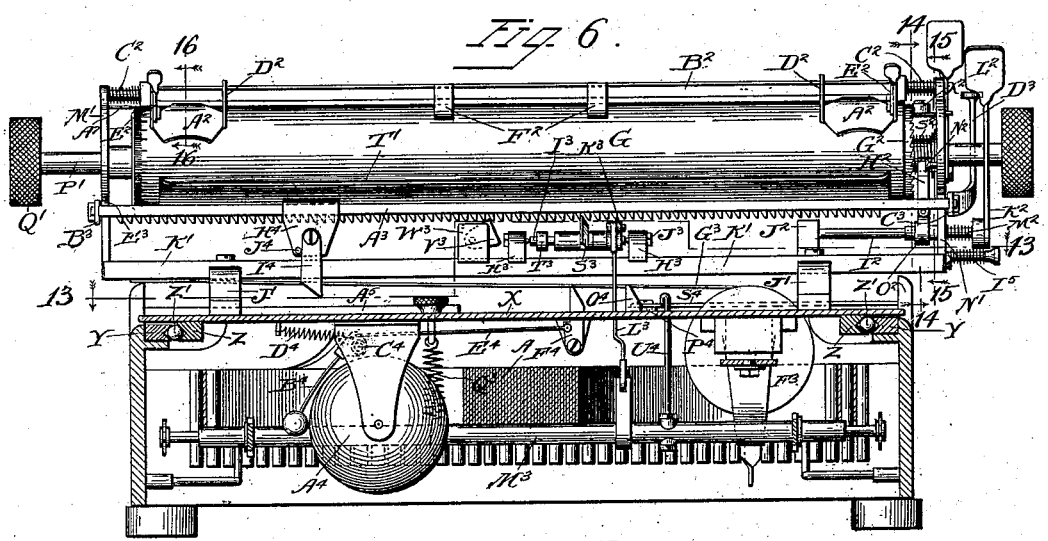
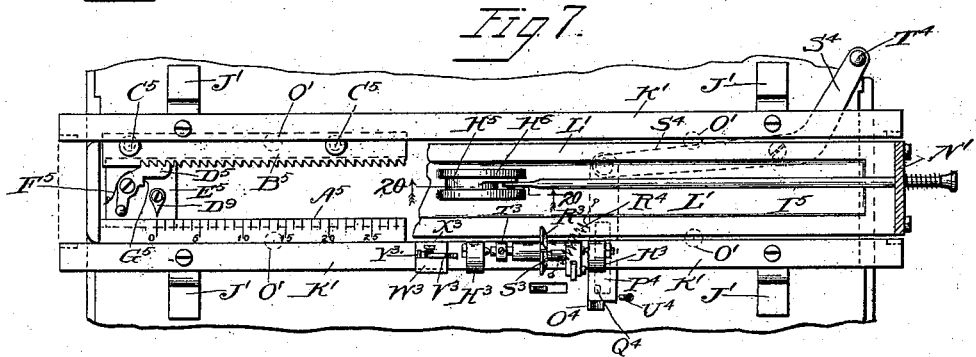
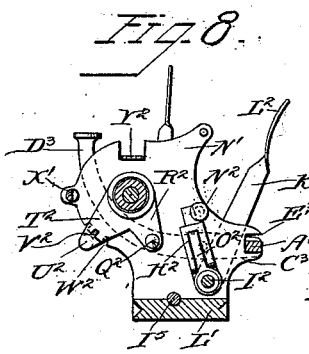
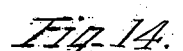
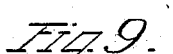
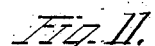
Witnesses
Martin H. Olsen
Leonora Wiseman
Inventor
Jason C. Lotterhand
by Edward Reeter
his atty
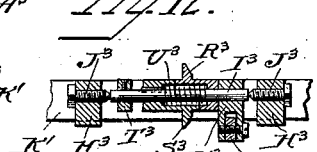

UNITED STATES PATENT OFFICE.

JASON C. LOTTERHAND, OF NEW YORK, N. Y., ASSIGNOR OF ONE-HALF TO WALTER B. MANNY, OF ST. LOUIS, MISSOURI.

TYPE-WRITER.

SPECIFICATION forming part of Letters Patent No. 692,793, dated February 4, 1902.

Application filed August 7, 1897. Serial No. 647,414. (No model.)

*To all whom it may concern:*

Be it known that I, JASON C. LOTTERHAND, a citizen of the United States, residing at the city of New York, in the State of New York, have invented a certain new and useful Improvement in Type-Writers, of which the following is a description, reference being had to the accompanying drawings, forming part of this specification.

My invention relates to carriage-driving and escapement mechanisms for type-writing machines, to paper holding and feeding mechanisms, to bell-ringing apparatus, to key-lock mechanism and to means for releasing the locked keys, to carriage-shifting mechanism, to margin-regulators, and to means for disengaging the members of the escapement mechanism.

Some of the features of the invention are more especially useful in that class of type-writing machines known as "visible-writing" machines, being machines in which the work is visible to the operator as it progresses, as distinguished from those machines in which the work can only be observed by lifting the paper-carriage or otherwise moving it to abnormal position for that purpose.

The objects of the invention are the improvement and simplification of the mechanisms hereinbefore mentioned, as well as the reduction of the cost of manufacture and the size and weight of the entire machine, while leaving its capacity unimpaired.

Another object of the invention is to embody conveniences and improvements not found in other machines now in use; and a further object is to have every word of the work done upon the machine clearly visible to the operator at the time it is written.

The novelty of the invention consists in certain new constructions, arrangements, combinations, and modes of operation of the various parts of the machine, all as will be hereinafter more fully described, and particularly set forth in the claims.

In the accompanying drawings, Figure 1 represents a top plan view of the machine with the paper-carriage in about middle position; Fig. 2, a bottom plan view thereof looking at the machine as though it were standing upright upon its rear end; Fig. 2$^a$, a sectional detail on the line 2$^a$ 2$^a$ of Fig. 2; Fig. 3, an elevation of the left side of the machine; Fig. 4, a middle longitudinal vertical section looking toward the right; Fig. 4$^b$, a sectional detail on the line 4$^b$ 4$^b$ of Fig. 4; Fig. 5, a vertical section approximately on the line 10 10 of Fig. 1 looking to the rear; Fig. 6, a vertical cross-section approximately on the line 12 12 of Fig. 4 looking toward the front of the machine; Fig. 7, partly a horizontal plan and partly a sectional view approximately on the line 13 13 of Fig. 6, part of the view being a section through the paper-carriage and the remainder being a view of the parts beneath the carriage with the end of the latter broken away; Fig. 8, a vertical section approximately on the line 14 14 of Fig. 6; Fig. 9, a similar view on the line 15 15 looking in the opposite direction; Fig. 10, a sectional detail on the line 16 16 of Fig. 6; Fig. 11, a detail front elevation of part of the rack-bar and the lifting-plate coöperating therewith; Fig. 12, a horizontal section through the escapement-pallets and the shaft upon which they are mounted; Fig. 13, a perspective view of the pawl for turning the platen-roller; Fig. 14, a sectional detail on the line 20 20 of Fig. 7.

The same letters of reference are used to indicate corresponding parts in all the views.

The key-levers A, preferably stamped from sheet metal, are fulcrumed at their rear ends upon a rod B, which is suitably supported in the main frame of the machine, and the upturned front ends of the key-levers A are provided with finger-buttons C, as in a "single-case" machine, the said front ends being suitably spaced apart, as will be understood. Immediately in rear of the keyboard the key-levers A fit between and are guided in their vertical movements by a series of vertical pins E, depending from the frame-plate F.

The platen-roller G is mounted in a backwardly and forwardly shiftable paper-carriage controlled by an upper-case key H, Fig. 1, as hereinafter more fully described, and the type-bars I, carrying the printing-types J, are arranged in the arc of a circle in front of said roller intermediate the same and the keyboard of the machine. The type-bars in the instance shown are provided each with two type and are pivoted near their lower ends upon type-bar hangers K, which are suitably secured at the upper side of a sector-shaped frame L, secured at its opposite ends in the main frame of the machine. The type-bars are connected by wires M with their respective key-levers A and are normally held against the type-bar rest V by means of springs R, connected at their ends to the type-bars and to ears Q, connected with the frame L.

The construction, arrangement, and other features relating to the type mechanism herein shown and above referred to form the subject-matter of the claims of a divisional application filed April 10, 1899, Serial No. 712,476.

When in normal position, the type-bars rest at their outer sides against a curved type-bar rest V, supported at its opposite ends upon the end of the frame L by means of downwardly-extending arms W. The shaft B, on which the key-levers A are journaled, is suitably mounted in lugs or brackets D, attached to the frame of the machine.

The paper-carriage is mounted upon a backwardly and forwardly shiftable plate or frame X, Figs. 1, 2, 3, 4, 6, and 7. The manner of supporting this plate X upon the main frame of the machine is best shown in Figs. 5 and 6, where it will be seen that the opposite side plates of the frame of the machine have secured to them two bars Y Y, provided with V-shaped grooves along their inner sides, while the plate X has secured to its under side adjacent the respective bars Y Y two similar bars Z Z, provided upon their outer sides with V-shaped grooves corresponding to those in the bars Y Y, while fitting between said grooves are balls Z'. The adjustment of the parts is such that the plate X is entirely supported upon the balls and the friction between it and the frame of the machine thereby relieved.

The purpose of shifting the frame X forward and backward is to move the platen carried thereby from the position in which the lower-case letters and other characters are printed by one set of the double-case type on the type-bars to the position in which the upper-case letters and other characters are printed by the other set of type on the bars.

As heretofore stated, the backward and forward movements of the paper-carriage are controlled by the upper-case key H. This is secured to the front end of a lever A', which is fulcrumed at the extreme rear end of the machine at the left-hand end of the fulcrum-rod B of the main key-levers, Figs. 2 and 3. The lever A' has connected to it the horizontal arm of a bell-crank lever B', Figs. 2 and 3, hung upon a stud projecting inward from the side frame of the machine and whose upper end bears against the forward edge of the frame X, or in this particular instance against the front end of the left-hand bar Z, secured to the side of said frame, as heretofore. When the key H is depressed, the upper end of the bell-crank is thrown rearward and the frame X and parts carried by it moved in that direction, and when the key is released the parts will be returned to forward position by a coiled spring C', Fig. 2, connected at its rear end to the frame X and at its forward end to a fixed part of the framework.

For the purpose of holding the frame X and paper-carriage in rearward position when desired there is provided a crank A, Fig. 3, journaled in the side frame of the machine and having upon its inner end a short arm adapted to bear upon the upper edge of the lower arm of the bell-crank B'. By swinging the lower end of the crank-handle upward and forward the lower arm of the bell-crank may be depressed and the frame X thrown rearward and held in such position as long as desired by the engagement of the arm of the crank with the bell-crank.

The frame X is limited in its backward and forward movement by the stop devices shown in Figs. 2 and 2ª, where D' represents a bar firmly secured to the under side of the rear top plate of the main frame of the machine and extending forwardly therefrom and provided with a longitudinal slot E'. Located upon the upper side of the bar D' are two adjustable stops F' F', provided upon their under side with lugs fitting in the slot E'. Screws G', passed through the slot E' from the under side of the bar D' and entering the stops F' F' or the lugs thereof and having washers H' interposed between their heads and the under side of the bar D', serve to hold the stops F' F' in fixed position upon the bar D', but also permit the necessary adjustment of them. Secured to or formed upon the under side of the frame X is a block I', which fits and has play between the stops F' F' upon the upper side of the bar D', the contact of which block with said stops limits the backward and forward movements of said frame.

The laterally-movable paper-carriage is mounted upon the upper side of the backwardly and forwardly shiftable frame X near its forward end in the following manner: Supported upon the frame X by means of four brackets J', two being located near the opposite sides of the frame, Fig. 7, are two transverse bars or guide-rails K' K', the rear one of which is provided upon its forward side and the forward one upon its rear side with a V-shaped groove, Fig. 4. The main frame of the laterally-movable paper-carriage is composed of a bottom plate or bar L', Figs. 4 and 7, and two vertical side or end plates M' N', secured to the opposite ends of the plate L'. The latter plate fits between the two bars K' K' above described, Figs. 4 and 7, and is provided upon its front and rear edges with V-shaped grooves opposite those in the bars K', and balls O' are interposed between the front and rear edges of the plate L' and the respective bars K' and serve to support the paper-carriage upon said bars and relieve the friction between the parts in the lateral movements of the carriage.

The spindle P' of the platen-roller G is journaled at its opposite ends in the side plates M' N' of the paper-carriage and provided with milled thumb-pieces Q' Q', by which it may be turned backward and forward, the thumb-piece Q' upon its left end being omitted from the view in Fig. 3 to better show the parts behind it. Bearing against the under forward side of the platen-roller G is the feed-roller R', whose spindle is supported at its opposite ends in bearings S', projecting from the front edge of the paper shelf or table T', Fig. 4, which extends beneath and to the rear of the platen-roller G and serves to guide the paper as it is inserted in the machine. This paper-shelf T' has projecting from its opposite ends short spindles U', Figs. 4 and 5, journaled in the respective end plates M' N' of the paper-carriage, so that the paper-shelf and the pressure-roller R', carried by it, are free to rock upon their support. Flat springs V', secured at their rear ends to the bottom plate L' of the paper-carriage, press upwardly at their forward ends against the under sides of the bearings S', in which the opposite ends of the spindle of the roller R' are carried, and serve to press the roller R' against the platen-roller. This pressure of the roller R' against the roller G may be relieved and the roller R' thrown out of contact with the roller G whenever desired by simply pressing upward upon the rear edge of the paper-shelf T'. In this manner the sheet of paper inserted between the platen-roller and roller R' may be readily released at any time for the purpose of removing or adjusting it.

The scale of the machine is formed upon a curved plate W', fitting against the forward side of the platen-roller G, Figs. 1, 4, and 5. The plate W', is secured to the rear side of and carried by a rod X', which is mounted at its opposite ends in short slots or elongated openings in the respective side plates M' N' of the paper-carriage, as shown in Figs. 3, 4, and 9. Coiled springs Y' Y', connected to the rod X' at its opposite ends, Fig. 1, serve to yieldingly hold the rod in rearward position, with the plate W' fitting against the roller G. The plate W', yieldingly pressed against the platen-roller in this manner, serves to properly direct the paper upward around the forward side of the roller and also furnishes a location for the scale in front of the printing-line. The plate is preferably provided with a series of openings X'', through which the lower edge of the sheet of paper may be observed as the writing approaches the lower end of such sheet, thus obviating the necessity of carefully watching the sheet in order to prevent writing too near the bottom of it.

As the sheet of paper passes upward and rearward from beneath the plate W' it passes beneath a pair of paper-fingers $A^2$, mounted upon a square rock-shaft $B^2$, journaled at its opposite ends in the side plates of the paper-carriage, Figs. 1, 3, 4, 5, and 6. Coiled springs $C^2$, surrounding the rock-shaft $B^2$ at its opposite ends and secured at one end to the shaft and at their opposite ends to the side plates of the paper-carriage, tend to turn the shaft forward and serve to yieldingly press the paper-fingers $A^2$ against the upper side of the platen-roller. Each of the paper-fingers $A^2$ is mounted upon the rock-shaft $B^2$ by means of two upwardly-bent ears $D^2$, provided with square holes, through which the rock-shaft passes, thus leaving the fingers free to be slid longitudinally along said shaft. For the purpose of holding the paper-fingers in the different positions to which they may be adjusted along the shaft $B^2$ each one of said fingers has pivoted to one of its upwardly-projecting ears $D^2$ a short arm $E^2$, the pivotal point of the arm being immediately beneath the shaft $B^2$ and the arm extending rearwardly and upwardly from its pivotal point to form a handle for manipulating the arm, as shown in Figs. 1, 3, 6, 9, and 10. As seen in Fig. 10, the forward end of the arm $E^2$ above its pivot is formed into a cam-surface adapted to bear against the under surface of the rock-shaft $B^2$ when the rear end of the arm $E^2$ is thrown upward and forward, and thereby serve to lock the paper-finger in place on the shaft $B^2$. When it is desired to shift the finger longitudinally of the shaft, it may be released for that purpose by pressing the rear end of the arm $E^2$ downward, and thereby disengaging the cam-surface of the arm from the under surface of the shaft $B^2$.

The above-described construction and arrangement of parts furnish a simple and convenient support for the paper-fingers and permit them to be readily adjusted laterally to different positions and firmly held in such adjusted position.

The rock-shaft $B^2$ has secured to it in fixed position near its middle two curved fingers $F^2$, Figs. 1 and 6, under which the middle portion of the sheet of paper passes and which serve to hold such portion of the paper in proper position during its movement beneath them.

The platen-roller is turned rearward in the regular operation of the machine to space the lines by means of a ratchet-and-pawl mechanism at its left-hand end, which may be next described. The roller has secured to its left-hand end an annular ratchet $G^2$, Figs. 1, 5, 6, and 9, with which coöperates a pawl $H^2$, mounted (in the manner hereinafter described) upon a rock-shaft $I^2$, Figs. 6 and 9, journaled at its inner end in a lug $J^2$, projecting upward from the bottom plate L' of the paper-carriage and passing at its outer end through the left-hand side plate N' of said carriage, and having secured to and projecting upward from its extreme outer end a lever or handle $K^2$, shaped at its upper end to form a finger-piece $L^2$ for convenience of manipulation. A coiled spring $M^2$, surrounding the shaft $I^2$ between the plate N' and lever K², Fig. 6, and secured at one end to said plate and at its opposite end to the shaft or to the hub of the lever K², tends to turn the shaft I² rearward and serves to yieldingly hold the pawl H² and lever K² in their normal rearward positions, the rearward movement of the parts under the stress of the spring M² being limited by contact of the upper end of the pawl H² with a screw N², projecting inward from the plate N', Figs. 6, 8, and 9.

The pawl H² is not mounted rigidly or directly upon the rock-shaft I², but, as seen in Figs. 8, 9, and 13, is pivotally mounted upon an arm O², rigidly secured upon the shaft, the lower portion of the body of the pawl being forked to straddle and embrace said arm. The upper end of the pawl H² is pressed inward (to the left in Fig. 6) by means of a wire spring P², secured at its lower end to the outer side of the arm O², Fig. 9, and bearing at its upper end against the outer side of the upper end of the pawl. The stress of this spring tends to throw the upper end of the pawl into engagement with the ratchet G² of the platen-roller; but when the parts are in their normal rearward position the upper end of the pawl is held away from the ratchet by engagement with the beveled head of the screw N², the head of this screw operating as a cam to throw the upper end off the pawl outward away from the ratchet as the pawl returns to its normal rearward position under the action of the spring M², as heretofore described. When, however, the upper end of the lever K² is pulled forward and the upper end of the pawl H² carried away from the screw N², the spring P² will throw the upper end of the pawl inward into engagement with the ratchet G² upon the platen-roller and the pawl be thereby caused to carry said roller with it during its forward movement imparted by the lever K². The forward throw of the lever K² is limited by contact of the upper end of the pawl H² with an adjustable stop Q². (Shown in Fig. 8.) This stop Q² consists of a stud projecting inward from the lower end of a plate R², hung at its upper end upon the spindle of the platen-roller and pressed against the inner face of the end plate N' of the paper-carriage by means of a coiled spring S², surrounding the spindle of the roller and confined between the end of the roller and the plate N' of the paper-carriage, Figs. 5 and 6. The plate R² has projecting forwardly from it an arm or extension T², provided with a knob or handle U², Figs. 1, 3, 5, 8, and 9, by means of which the plate may be swung backward and forward upon its pivotal support to adjust the stop Q² toward and from the pawl H², and the arm T² is provided upon its outer side with a lug V², adapted to coöperate with notches W², formed in the curved forward edge of the plate N', Figs. 3, 8, and 9. By means of the engagement of the lug V² with the notches W² in the plate N' the plate R², carrying the stop Q², may be held in its different adjusted positions. There are in the present instance three notches in the plate N', so that the plate R² and stop Q² may be held in any one of three different positions, the stop being held in rearmost position when the lug V² is engaged with the lowermost notch W², in middle position when engaged with the middle notch, and in forward position when engaged with the upper notch. The inner end of the stud or stop Q² is rounded or beveled to coöperate with the upper end of the pawl H², which latter is of the shape best shown in Fig. 13. When in its forward throw the upper end of the pawl H² contacts with the inner end of the stop Q², the pawl will be wedged by the beveled end of the stop into the particular notch of the ratchet with which the pawl is engaged, and the engagement of the pawl with the stop thus not only serves to arrest the pawl, but to lock the pawl in engagement with the ratchet, and thereby also positively arrest the movement of the ratchet and roller and prevent them being overthrown by any quick or violent manipulation of the lever K². The adjustment of the parts is such that when the stop Q² is in its rearward position it will serve to arrest the pawl and platen-roller when the latter has been turned the space of one notch or tooth of the ratchet. When the stop is in its middle position, it will permit the roller to be turned the space of two notches, and when in forward position it will permit it to be turned the space of three notches. In this manner the parts may be readily adjusted to space the lines either one, two, or three units of distance apart.

It will be understood from the foregoing that the pawl H² is normally entirely disengaged from the ratchet of the platen-roller, and the latter is free to be turned forward and backward by means of the milled thumb-pieces upon the opposite ends of its spindle. For the purpose of yieldingly holding the platen-roller in any position to which it may be so turned and also to enable it to be readily moved backward and forward the exact distance necessary to bring any desired line of written matter to the printing-line the ratchet G² upon the left-hand end of the roller is engaged by a roller X², Figs. 1, 3, 5, 6, and 9, which is mounted upon a stud carried by the inwardly-bent horizontal upper end of a spring-plate Y². This plate Y², as shown in Fig. 3, is secured at its extreme lower end to the outer side of the end plate N' of the paper-carriage and is provided near its middle with a hole through which the spindle of the platen-roller passes and at its upper end is bent inwardly to horizontal position and fits in a vertical slot cut in the upper edge of the plate N', as shown in Figs. 1 and 8. The size of the roller X² is such that the teeth of the ratchet G² may freely ride over it in either direction as the platen-roller is turned backward or forward; but at the same time the engagement of the roller with the notches of the ratchet serves to always arrest and yieldingly hold the roller in one or another of the different positions corresponding to the several notches of the ratchet.

For the purpose of disengaging the roller $X^2$ from the ratchet whenever desired and holding it disengaged therefrom to permit the platen-roller to be turned backward or forward with still greater ease and to permit it to be arrested, if desired, in a position intermediate those determined by the notches of the ratchet when the roller is engaged by the latter there is provided a disengaging-lever $Z^2$, Fig. 3, pivoted at its lower end to the plate $N'$ of the paper-carriage and formed at its upper end into a suitable finger-piece and provided upon its forward side with an arm or finger adapted when the lever is pulled forward to pass between the spring-plate $Y^2$ and the plate $N'$ of the paper-carriage and force the plate $Y^2$ outward, and thereby carry the roller $X^2$ away from the ratchet of the platen-roller. The roller will be held in this disengaged position until the lever $Z^2$ is again pressed rearward to normal position, in which position it is arrested by contact with a stop projecting from the plate $N'$, as seen in Fig. 3.

As shown in Figs. 1, 5, and 6, the platen-roller G is provided around its right-hand end with a series of graduations, with which coöperates a pointer $A^7$, secured to the end plate $M'$ of the paper-carriage. The main divisions on this scale upon the platen-roller correspond to the notches in the ratchet upon the opposite end of the roller, so that when the roller is in any one of what may be termed its "normal" positions (determined by the engagement of the roller $X^2$ with the notches of its ratchet, as heretofore explained) one of the main division-lines of the scale will stand opposite the pointer. When, however, the roller $X^2$ is held out of engagement with the ratchet by the lever $Z^2$, as heretofore explained, and it is desired to turn the platen-roller to position intermediate those positions determined by the engagement of the roller $X^2$ with its ratchet, the coöperation of the pointer with the minor divisions of the scale upon the platen-roller may be advantageously employed for adjusting the platen-roller to the exact position desired.

The escapement mechanism and coöperating parts will be next described, reference being had more particularly to Figs. 6, 7, and 12. The escapement bar or rack $A^3$ is supported at its opposite ends by side arms $B^3$ $C^3$, pivoted at their forward ends to the outer sides of the end frames $M'$ $N'$ of the paper-carriage, Figs. 3, 6, and 8, the side arm $C^3$ at the left-hand side of the machine being extended forwardly of its pivot to form an upwardly-curved arm $D^3$, provided with a button at its upper end, Figs. 3 and 8, for a purpose hereinafter described. At its opposite ends the rack-bar $A^3$ fits in recesses $E^3$ in the rear edges of the end frames of the paper-carriage, the upper and lower walls of which recesses limit the vertical play of the bar. A spring suitably applied to the bar at one end, but not shown, aids gravity in yieldingly holding it in and returning it to its lower normal position. The usual spring for moving the paper-carriage to the left in the operation of the machine is inclosed within a casing $F^3$, Figs. 2 and 6, and the strap $G^3$, connecting said spring with the under side of the paper-carriage at its right-hand end, is shown in Fig. 6. As also shown in said figure and also in Figs. 7 and 12, there are secured upon the upper side of the bar $K'$, heretofore described, two lugs $H^3$ $H^3$, between which is mounted a rock shaft $I^3$, engaged and supported at its opposite ends by centering-points upon the inner ends of screws $J^3$, passed through said lugs. An arm $K^3$, projecting rearwardly from its rock-shaft, has connected to its rear end the upper end of a link $L^3$, whose lower end is connected to the universal bar or rod $M^3$, forming part of a bail composed of said rod and two side arms $N^3$ $N^3$, Fig. 2, said side arms being hung at their rear end upon the fulcrum-rod B of the key-levers. The rod $M^3$ immediately underlies all of the key-levers A, as shown in Figs. 2 and 4, and also the side arms $O^3$ $O^3$ of the spacing-bar $P^3$ and is yieldingly held in and returned to upper position by a coiled spring $Q^3$, Figs. 4 and 6. At each depression of the front end of a key-lever or of the spacing-bar, therefore, the rock-shaft $I^3$ will be rocked rearward. Mounted upon this rock-shaft $I^3$ are two escapement-pallets, each consisting of a sleeve surrounding the shaft and having a sector-shaped wing or flange projecting from it. The right-hand one, $R^3$, of these two pallets, Figs. 6, 7, and 12, is fast upon the rock-shaft $I^3$, while the left-hand one, $S^3$, is splined upon the shaft, so as to turn with the shaft, but slide thereon, its movement to the right being limited by the sleeve of the pallet $R^3$ and in the opposite direction by a collar $T^3$, fast upon the shaft near its left-hand end. As shown in Figs. 7 and 12, the adjacent ends of the sleeves of these two pallets are so cut away that the ends of the sleeves may pass each other and allow the two pallets $R^3$ $S^3$ to stand in the same vertical plane with each other circumferentially of the shaft when the pallet $S^3$ is moved to the right, as shown in the drawings. The adjacent ends of the two sleeves are counterbored and have interposed between them a coiled spring $U^3$, (shown in Fig. 12,) which tends to press the pallet $S^3$ to the left and contact the end of its sleeve with the stop-collar $T^3$.

Under the above construction and arrangement of the parts the operation is as follows: In normal position of rest the pallet $R^3$ stands forward of the rack $A^3$ and out of engagement therewith, Fig. 6, while the pallet $S^3$ is engaged with a tooth of the rack and serves to hold it from movement toward the right under the stress of the paper-carriage spring. The action of this spring overcomes the resistance of the coiled spring $U^3$, interposed between the two pallets, and the pallet $S^3$ is held in right-hand position (referring to the drawings) in the same vertical plane as the pallet $R^3$. When the front end of a key-lever or the spacing-bar is depressed and the shaft $I^3$ rocked rearward, as above described, the pallet $S^3$ will be carried rearward out of engagement with the tooth of the rack, while the pallet $R^3$ will at the same time be carried into the path of said tooth and serve to hold the rack-bar and paper-carriage from movement. Immediately upon its disengagement from the tooth of the rack-bar the pallet $S^3$ will be thrown to the left by the coiled spring $U^3$ until its sleeve contacts with the collar $T^3$, bringing it opposite the next succeeding notch in the rack-bar. When the operated key-lever or the spacing-bar is now released and the rock-shaft $I^3$ turned forward to normal position by the action of the spring $Q^3$ upon the universal rod $M^3$, the pallet $R^3$ will be carried forward out of engagement with the first-mentioned tooth of the rack, while the pallet $S^3$ will be carried into the path of the succeeding tooth, and as soon as the rack-bar is released by the disengagement of the pallet $R^3$ from the first-mentioned tooth the paper-carriage spring will move the paper-carriage and rack-bar to the right, carrying the pallet $S^3$ with them, until they are arrested by the contact of the sleeve of the pallet $S^3$ with the sleeve of the pallet $R^3$, as shown in Fig. 6. At each depression and release of the key-lever or the spacing-bar the paper-carriage is thus permitted to move the distance of one tooth or notch of the rack-bar.

It will be seen that by the employment of escapement-pallets constructed and arranged as above described I succeed in bringing the points of engagement of the pallets with the teeth of the rack-bar very close to the pivotal axis of the pallets, and thereby reduce to the minimum the power necessary for the operation of the pallets. The construction and arrangement employed are also exceedingly simple and such as to withstand to the highest degree the strain and wear incident to the operation of the machine and reduce to the minimum the necessity for readjustment of the parts. It will also be seen that the movement of the pallet $S^3$ with the rack-bar is a sliding movement exactly parallel with the movement of the rack-bar and paper-carriage, so that during such movement the pallet and rack-bar remain in the same position relatively to each other, and there is no movement of the one upon or independent of the other, as necessarily occurs where the movement of the pallet with the rack-bar is movement in the arc of a circle, as is the case where such movement of the pallet is on a pivotal axis transverse to the movement of the rack-bar.

For the purpose of automatically lifting the rack-bar when the paper-carriage is shifted to right-hand position to begin a new line and prevent the rack-bar dragging over the pallet $S^3$ there is provided at the left of the escapement mechanism in Fig. 6 an automatic lifting device consisting of a plate $V^3$, pivoted to the forward side of a support $W^3$, secured to the upper side of the bar $K'$, heretofore referred to, Figs. 6, 7, and 11. The plate $V^3$ is normally pressed upward by a spring $X^3$, surrounding its pivot, Fig. 11, so that its upper corner engages the rack $A^3$ and in normal position rests between the lower ends of two adjacent teeth of the rack. As the machine is operated and the rack moves to the right in Fig. 6 its teeth slip freely over the corner of the plate $V^3$, the spring $X^3$ being light and readily yielding for that purpose; but when the paper-carriage is pushed in the reverse direction (to the left in Fig. 6) the upper corner of the plate $V^3$ locks between the lower end of the two adjacent teeth of the rack, and the pressure of the latter upon it swings it to the left upon its pivot, thereby causing its corner engaged with the rack to rise and lift the rack with it. When it has lifted the rack until the upper surface of the plate is brought to horizontal position beneath the rack, it will be arrested by contact with a stop $Y^3$ upon its support $W^3$, and the rack will then freely travel over its upper surface. Upon the first movement of the paper-carriage in the reverse direction (to the right in Fig. 6) the lifter-plate $V^3$ will return to the position shown in said view, and during the continued movement of the paper-carriage in that direction the teeth of the rack will slide freely over the corner-plate, as heretofore described.

It will be understood from the foregoing that the paper-carriage may be freely slid toward the right at any time by simply pushing it in that direction without the necessity of manipulating any device for lifting the rack-bar out of engagement with the pallet or otherwise disengaging them, as is necessary in many machines now in use. When it is desired to slide the paper-carriage to the left independently of the operation of the keys or space-bar, the rack-bar $A^3$ may be readily lifted out of engagement with the pallet $S^3$ to permit such movement by depressing the front end of the lever $D^3$, heretofore described, Figs. 3 and 8.

The gong-sounding devices of the machine, by which the gong $A^4$, Figs. 2, 5, and 6, is sounded as the paper-carriage approaches its limit of movement to the left, may be next described, reference being had to Figs. 4, 5, and 6. The gong-striker is carried by a lever $B^4$, pivoted at $C^4$ to a support depending from the under side of the frame X. Connected to the short arm of this lever above its pivot is a coiled spring $D^4$, extending in one direction, while connected to the lever near the same point and extending in the opposite direction is a link $E^4$, which serves to connect the striker-lever with a short lever $F^4$, pivoted at its lower end to a support depending from the under side of the frame X and projecting at its upper end through a slot in said frame into the path of travel of the trip carried by the paper-carriage. The trip in the present instance consists of an arm G⁴, loosely pivoted at its upper end to the vertically-depending rear end of a plate H⁴, mounted upon the rack-bar A³, Figs. 4 and 6. The trip-arm G⁴ is not shown in Fig. 6, being immediately behind and hidden by a similar arm I⁴, hung at its upper end upon the rear side of the plate H⁴, the trip-arm G⁴ being hung to the forward side of said plate. A stoppin J⁴, extending through the plate H⁴ and projecting to the front and rear thereof, limits the movement of both arms G⁴ and I⁴ in one direction, to the left in Fig. 6. As the paper-carriage moves toward the right in Fig. 6 the lower end of the trip-arm G⁴ will contact with the upper end of the lever F⁴ and swing the latter to the right, retracting the gong-striker against the resistance of the spring D⁴, and when the lower end of the trip clears the upper end of the lever F⁴ and releases the latter the spring D⁴ will throw the striker against the gong to sound the latter. As the paper-carriage is moved in the opposite direction the lower end of the trip-arm G⁴ rides over the upper end of the lever F⁴ without moving the latter.

The plate H⁴ is adjustably secured upon the rack-bar A³, so that it may be moved longitudinally thereof and set in different positions to cause the gong to be sounded at different points in the travel of the paper-carriage. To this end the plate H⁴ is secured to the rack-bar in the following manner: The extreme forward edge of the horizontal upper portion of the plate is bent downward to vertical position and fits against the forward side of the rack-bar, Fig. 4. Secured to the under side of this horizontal portion at its junction with the vertical rear portion of the plate is a short bar or block K⁴, rectangular in vertical cross-section, which furnishes a support for a plate L⁴, which is secured at its rear edge to the under side of said bar and at its forward edge bears against the under surface of the rear portion of the rack-bar A³, in rear of the teeth of said bar. A screw M⁴, passed from the under side of the plate L⁴ through a hole in the latter, enters at its upper end a threaded hole in the horizontal top of the plate H⁴, so that by tightening up this screw the rack-bar may be clamped between said plate and the plate L⁴. Interposed between the head of the screw M⁴ and the under side of the plate L⁴ is a spring N⁴, Fig. 4ᵇ, bent downward at its middle, where it is engaged by the head of the screw, and bearing at its opposite ends against the under side of the plate L⁴. The interposition of this spring between the head of the screw and the plate L⁴ permits the pressure of the forward edge of the plate L⁴ against the under side of the rack-bar A³ to be better regulated by means of the screw and enables the parts to be frictionally held with any desired degree of resistance against movement longitudinally along the bar A³. By sliding the plate H⁴ longitudinally of the bar A³ to different positions thereon the bell may be sounded at different points in the travel of the paper-carriage, according to the length of the lines which it is desired to write.

The arm I⁴, which is hung to the rear side of the plate H⁴, as above described, constitutes part of an automatic locking mechanism, which may be adjusted to automatically lock the machine at any predetermined point in the movement of the paper-carriage to the left, whereby the machine may be set to print lines of any desired length within its capacity and uniformity in the lengths of the lines under any particular adjustment be effectively preserved by such automatic locking of the machine when the end of the line is reached. The arm I⁴ coöperates with a lug O⁴, located in its path of travel upon the upper side of the frame X, at the right of the gong-lever F⁴ in Fig. 6. As shown in Fig. 7, the lug O⁴ is formed upon the rear end of a plate P⁴, mounted to slide backward and forward upon the upper surface of the frame X. This plate P⁴ is provided upon its under side with a lug Q⁴, (shown in dotted lines in Fig. 7,) which lug passes through and travels in a slot in the frame X. A coiled spring R⁴, connected at its forward end to the plate P⁴ and at its rear end to a stud upon the frame X, pulls the plate P⁴ rearward and yieldingly holds it in normal position, with its lug Q⁴ in contact with the rear wall of its slot in the frame X. This slot is somewhat wider than the lug, as shown by the dotted lines in Fig. 7, and permits slight lateral movement of the rear end of the plate P⁴ and the lug O⁴. As the paper-carriage moves to the right in Figs. 6 and 7 the lower end of the arm I⁴ will contact with the lug O⁴ on the plate P⁴ and swing the rear end of the latter to the right until it is arrested by the contact of its lug Q⁴ with the right-hand wall of the slot in the frame X. Immediately at the right of the plate P⁴ there projects upward through an opening in the frame X a rod or wire U⁴, whose lower end is secured to the universal rod M³, heretofore described, and whose extreme upper end is provided with a hook or projection facing the plate P⁴. When the arm I⁴ contacts with the lug O⁴ and swings the rear end of the plate P⁴ to the right, as heretofore described, the edge of said plate will be carried under the hook or projection on the upper end of the rod U⁴, so that the latter will be locked from downward movement, and inasmuch as the lower end of said rod is secured to the universal rod M³, which is depressed by the operation of any key-lever or of the spacing-bar, it follows that this locking of the rod U⁴ from downward movement serves to lock all of the key-levers and the spacing-bar from operation.

It will be understood from the foregoing that the locking device described serves to automatically lock the machine whenever the paper-carriage reaches a position in its movement to the left which causes the arm I⁴ to contact with the lug O⁴ and swing the rear end of the plate P⁴ beneath the projection or hook upon the upper end of the rod U⁴, and inasmuch as the plate which carries the arm I⁴ is adjustable longitudinally of the rack-bar A³, as heretofore described, it follows that by adjusting said plate to different positions longitudinally of the rack-bar the locking mechanism may be set to lock the machine at any desired point in the travel of the paper-carriage. The machine may thus be readily adjusted for lines of any desired length within its capacity. The adjustment is readily effected by first setting the paper-carriage to the desired position for the termination of the lines, as at 40 or 50 or 60, for instance, and then with the carriage in this position sliding the plate H⁴ along the rack-bar A³ until the arm I⁴ contacts with the lug O⁴ on the plate P⁴ and presses the latter to the right to its limit of movement, Fig. 6. When this has been done, the paper-carriage may be returned to right-hand position for the beginning of the first line, and thereafter in the operation of the machine it will be arrested at each travel toward the left at the particular point determined by the setting of the locking mechanism in the manner above described.

For the purpose of readily withdrawing the plate P⁴ from beneath the projection upon the upper end of the rod U⁴, and thereby unlocking the machine to permit further operation of it and further movement of the paper-carriage toward the left—as, for instance, where the machine becomes automatically locked in the middle of or near the end of a word and it is desired to finish the word in that line—there is pivoted to the upper side of the frame X a lever S⁴, Fig. 7, whose left-hand end is connected to the forward end of the plate P⁴ and whose right-hand end extends outwardly and forwardly to the side of the machine and is provided with a knob T⁴, by means of which the outer end of the lever may be readily pressed rearward by the operator whenever it is desired to permit extra operation of the machine beyond the locking-point, as for the purpose above mentioned.

It will be observed that the plate or bar P⁴ is arranged to have motion about two independent parallel axes—to wit, its pivotal connection with the lever S⁴ and the pivot of said lever S⁴ itself. The plate P⁴ is thus capable of a swinging motion about its pivotal connection with the said lever S⁴ and also of an independent endwise motion. A universal motion in a plane is thus provided for the stop or locking plate P⁴. The plate P⁴ is withdrawn from the path of the arm I⁴ by the rearward motion of the lever S⁴, and the spring R⁴ thereupon returns plate P⁴ to its normal position against the stop Q⁴.

The next feature of the machine to be described is the adjustable marginal stop for limiting the movement of the paper-carriage toward the right in resetting it for the beginning of a new line. As seen in Fig. 7, there are mounted upon the upper side of the frame X, beneath the right-hand end of the paper-carriage, (when the latter is in the position shown in the drawings,) two parallel plates A⁵ B⁵. The rear one, A⁵, of these two plates is secured in fixed position upon the upper side of the frame X, while the forward one, B⁵, is attached to the frame by means of bolts C⁵ passing through short longitudinal slots in the plate. The plate B⁵ has its rear edge formed into a rack, (or ratch,) with the teeth of which coöperates a latch D⁵, pivoted upon the upper side of a rectangular plate E⁵, confined between the plates A⁵ B⁵ and adapted to be slid longitudinally of them upon the upper surface of the frame X. The latch D⁵ is provided with teeth similar to the teeth upon the plate B⁵ and adapted to coöperate therewith and is pressed into engagement with the rack by a spring F⁵. The plate A⁵ is provided with a scale, as shown, with which coöperates a pointer D⁹ on the plate E⁵ to indicate the different positions of the plate E⁵ longitudinally of the plates A⁵ B⁵. The latch D⁵ is provided with a shoulder G⁵, which coöperates with the depending lower end of a plate H⁵, pivoted at its upper end between ears H⁶, formed upon the upper side of the bottom plate L' of the paper-carriage frame, Figs. 6, 7, and 14, the lower end of said plate depending through a longitudinal slot in said plate, as shown. The plate H⁵ is free to swing in one direction—to the left—but is held from movement in the opposite direction by the stop H⁷, Fig. 14. When the paper-carriage is slid to the right in its resetting movement, the lower end of the plate H⁵ will contact with the shoulder G⁵ of the latch D⁵, thus arresting the paper-carriage and limiting its movement in such direction. The plate E⁵ and latch D⁵ may be adjusted longitudinally of the plates A⁵ B⁵ and set in any desired position, according to the scale upon the plate A⁵, to produce the desired width of margin upon the left-hand side of the sheet of paper, as will be readily understood.

Under the arrangement of the stop devices above described the shock of arresting the paper-carriage at the end of its resetting movement is borne by the main frame of the machine, instead of being borne by some more delicate part of the machine, as is frequently the case.

For the purpose of throwing the stop devices above described out of operation whenever it is desired to move the paper-carriage to the right beyond the point for which the stop is set and to permit such movement of the carriage without disturbing the adjustment of the stop there is provided a releasing device consisting of a rod I⁵, whose left-hand end projects through the left-hand side frame N' of the paper-carriage and is surrounded by a coiled spring confined between the button upon the end of the rod and said side frame, Figs. 5, 6, and 7. The rod extends to the right longitudinally of the paper-carriage to a point adjacent its middle, and at its extreme right-hand end enters the slot or opening between the ears $H^6$, between which the stop-plate $H^5$, heretofore described, is pivoted, and is connected to said plate, Figs. 7 and 14. The coiled spring surrounding the rod $I^5$ at its outer end yieldingly holds it in normal left-hand position; but when the rod is pressed inward its inner end will swing the plate $H^5$ upward above the horizontal plane of the shoulder upon the latch $D^5$, and thus while in this position permit the lower end of said plate to clear the shoulder on the latch-plate when the paper-carriage is moved toward the right. By pressing the left-hand end of the releasing-rod $I^5$ inward at any resetting of the paper-carriage, therefore, the latter may be moved to extreme right-hand position or to any other desired position beyond the point at which the marginal stop may be set to arrest it.

$K^5$ is an inking-ribbon wound at one end upon a spool $L^5$ and at its opposite end upon a spool $N^5$, said spools being suitably secured to the framework of the machine by means of arms $M^5$.

$O^5$ $R^5$ are ratchet-wheels upon the spools $L^5$ $N^5$, and $P^5$ $S^5$ are pawls for operating said ratchet-wheels. The pawls $P^5$ $S^5$ are pivotally connected with arms $U^5$ $T^5$, pivoted at $b$ to the frame of the machine and connected at their rear ends with the universal bar $M^3$. The pawls are drawn toward the ratchets by springs $V^5$.

$Q^5$ is one of two detents for preventing backlash of the ribbon-spools, and the pawls and detents are alternately engaged with and disengaged from their respective ratchet-wheels by a notched rock-shaft $W^5$, having a handle $X^5$.

$Y^5$ $Y^6$ $Z^5$ $Z^6$ are guide-rollers for the ribbon $K^5$.

$A^6$ is a curved vertical plate or frame secured at its lower end to the frame X, and $B^6$ is a pointer which coöperates with the scale upon the plate $W^5$, as shown in Fig. 1.

$C^6$ represents ears connected with the plate $A^6$, between which a rocking ribbon-carrier is pivoted.

$D^6$ is a lower cross-bar or plate $E^6$, with two vertical extending arms formed integral therewith, and $F^6$ an upper plate intermediate and integral with the upper ends of the arms $E^6$ of the said rocking ribbon-carrier frame. $c$ represents ribbon-guiding ears on the said frame, and $d$ represents guide-arms formed integral with the cross-bar $D^6$.

$G^6$ is an elongated opening or slot in the top plate $F^6$ to permit the passage of the type on the bars.

$I^6$ is a bracket secured to the frame X in front of the plate $A^6$ and to which is pivoted a lever $J^6$, and to the forward end of the lever $J^6$ is pivoted a link $K^6$, also pivoted to a universal bar $L^6$, underlying the key-levers A and forming part of a bail, whose side arms $M^6$ extend rearwardly and are pivotally supported in the side frames of the machine.

$N^6$ is a pin or screw passing through slots in the plates $I^6$ and connected to the lower ends of two arms $O^6$, whose upper ends are pivoted to an arm $P^6$, projecting forwardly from the cross-bar $D^6$. A coiled spring $Q^6$, connected to the bracket $I^6$ and one of the rods $O^6$, holds said rods downwardly. The lever $J^6$ operates the pin $N^6$ of the ribbon-carrier in a manner more fully set forth in another divisional application, Serial No. 712,477, filed April 10, 1899. Hence the ribbon-operating mechanism need not be described herein more in detail, since the same is fully described and claimed in said divisional application.

Having thus fully described my invention, I claim—

1. In a type-writing machine, the combination with the main frame of the machine, of a carrier-frame movable rearwardly and forwardly of the main frame, a paper-carriage movable to and fro on said carrier-frame at right angles to the direction of motion thereof, an upper-case key, a bell-lever connecting said key with said carrier-frame, a spring for returning said carrier-frame to normal position after displacement therefrom by said bell-lever, and a movable crank or cam for actuating said bell-lever and carrier-frame and holding them in their shifted positions against the force of said spring, substantially as described.

2. The combination of a main frame carrying type-operating mechanism and a universal bar, a backwardly and forwardly moving frame mounted on the main frame and carrying a laterally-movable paper-carriage, letter-spacing mechanism carried by said moving frame and by said carriage, one part on each, whereby operative connection is maintained between said parts, and connections between the said letter-spacing mechanism and the universal bar for operating the said letter-spacing mechanism in all positions of the moving frame, substantially as described.

3. The combination of a main frame carrying type-operating mechanism and a universal bar, a backwardly and forwardly moving frame mounted on the main frame and carrying a laterally-movable paper-carriage, letter-spacing mechanism carried by said moving frame and by said carriage, one part on each, whereby operative connection is maintained between said parts, ribbon-spools mounted upon the main frame, a ribbon-guide upon the moving frame, and connections between the letter-spacing mechanism and the universal bar, substantially as described.

4. The combination, with the platen-roller G, of the bar $B^2$ extending longitudinally thereof and journaled at its opposite ends in the paper-carriage frame, the paper-fingers $A^2$ $A^2$ mounted upon said bar and adjustable longitudinally thereof, and the springs C² applied to the opposite ends of said bar and pressing the paper-fingers A² against the platen-roller G, substantially as described.

5. In a type-writing machine, the combination of a platen-carrier frame, a platen-roller journaled therein, a spring-pressed bar extending longitudinally of the platen and journaled in the said frame, and paper-guide fingers mounted on said bar in a non-rotative manner and adjustable longitudinally thereof and coacting with the platen-roller, substantially as described.

6. The combination, with the platen-roller G, of the bar B² extending longitudinally thereof and journaled at its opposite ends in the paper-carriage frame, the paper-fingers A² A² mounted upon said bar and adjustable longitudinally thereof, the springs C² applied to the opposite ends of said bar to press the paper-fingers A² against the platen-roller, and the cam-arms E² carried by the paper-fingers A² and coöperating with the bar B² to hold the paper-fingers in their different adjusted positions along said bar, substantially as described.

7. The combination, with the platen-roller G provided with the ratchet G² at one end, of the rock-shaft I², the arm O² fast thereon, the pawl H² pivotally mounted on the arm O² and spring-pressed toward the ratchet G², the screw N² coöperating with the pawl H² to disengage it from the ratchet, the spring M² for yieldingly holding the rock-shaft and pawl in and restoring them to normal position, and the lever K² for operating the rock-shaft.

8. In a type-writing machine, the combination of a platen-frame, a cylindrical platen having a ratchet-wheel at one end thereof, a spring-pressed rock-shaft mounted in said frame and parallel to said platen, a pawl connected to said rock-shaft at right angles thereto and to the axis of the platen and adapted to engage said ratchet-wheel, and a key or lever also attached to said rock-shaft at right angles thereto and arranged to work in a vertical plane substantially at right angles to the axis of said platen.

9. The combination, with the platen-roller G having the ratchet G², the rock-shaft I², the arm O² fast thereon, the spring-pressed pawl H² pivoted on said arm and coöperating with the ratchet G² and the stop-screw N², the spring M² applied to the shaft I², the lever K² for rocking said shaft, the stop Q² carried by the plate R² hung upon the spindle of the roller G and provided with the projection V² coöperating with the notches W² in the edge of the plate N', and with the knob U² for adjusting it from one position to another, and the spring S² bearing upon the plate R² and serving to hold its projection V² in engagement with the notches W² in the plate N', substantially as and for the purpose described.

10. The combination, with the platen-roller G provided with the ratchet G², of the spring-plate Y² carrying the roller X² engaging said ratchet, and the lever Z² adapted to pass between the plate Y² and the end of the carriage to disengage the roller X² from the ratchet, substantially as described.

11. In a type-writer, the combination of a platen-roller having a ratchet, a member frictionally engaging said ratchet to hold the roller in positions determined by the teeth or notches of the ratchet, means for disengaging such device from the ratchet, to permit the roller to be freely turned to and remain in any desired position, said roller being provided upon one end with a series of graduations having main divisions corresponding to the notches of the ratchet and minor divisions intermediate the same, and a pointer or index coöperating with such graduations to determine the position of the roller; whereby when the frictionally-engaging member is held temporarily out of engagement with the ratchet-wheel the paper may be conveniently and finely adjusted for printing between regular line-spaces, and so that such printing may occur at regular or uniform and predetermined interlinear places or heights.

12. The combination, with the rack-bar A³ of the paper-carriage, of the rock-shaft I³, the sleeve fast thereon and having formed upon it the pallet R³, the second sleeve splined upon the shaft I³ and having formed upon it the pallet S³, the spring U³ surrounding the shaft I³ within the counterbored ends of the respective sleeves, the stop T³ for limiting the movement of the pallet S³ under the action of the spring U³, the arm K³ fast upon the shaft I³, and the link L³ connecting the arm K³ with the universal bar of the machine.

13. In a type-writing machine and in an escapement mechanism, the combination of a carriage, a feed-rack, a member coöperating with the rack for letter-space feed, and means for automatically disengaging said rack and said member by the pressure of the rack on said means during retraction of the carriage, substantially as described.

14. In a type-writing machine, and in an escapement mechanism, the combination of a carriage having a feed-rack, a member coöperating with said rack for letter-space feed, and a movable device on the frame adjacent the path of the rack and having a part normally engaging with the teeth of the rack, whereby when a return movement of the carriage takes place the device is actuated by the rack and the rack in turn is moved by the device to cause a disengagement of the rack from its coöperating member, substantially as described.

15. In a type-writing machine and in an escapement mechanism, the combination of a carriage having a feed-rack, a member coöperating with said rack for letter-space feed, and a pivoted spring-pressed device having a part normally engaging with the teeth of the rack whereby when a return movement of the carriage takes place the device is actuated by the rack and the rack in turn is moved by the device to disengage it from its coöperating member, substantially as described.

16. In a type-writing machine and in an escapement mechanism, the combination of a carriage, a feed-rack, a member coöperating with the rack for letter-space feed, and said rack being movable to disengage it from said member, and a pivoted rack-mover adapted upon a return movement of the rack to be moved by the pressure of the rack-teeth thereon and during said motion to disengage the rack from its coöperating member and also to hold the rack disengaged during the retractile or return movement of the carriage but adapted to resume its normal position and to permit of the automatic reëngagement of the rack and its coöperating member immediately the retractile force on said rack is released, substantially as described.

17. In a type-writing machine and in an escapement mechanism, the combination of a carriage, a rack-bar movable transversely of its length into and out of position for engagement with a letter-space-feed coöperating member, the coöperating member, and a spring-pressed pivoted plate having a corner normally engaging the teeth of the rack-bar and permitting the rack-bar to move freely by it during the letter-space-feed movement of the carriage but operating to automatically move the bar out of engagement with its coöperating member and to so hold it during the return movement of the carriage, substantially as described.

18. In a type-writer, the combination, with the rack-bar of the paper-carriage, capable of vertical movement, of a spring-pressed pivoted plate engaging the teeth of said rack-bar, said plate permitting the teeth of the bar to ride freely over it as the paper-carriage travels in a forward direction but operating to automatically lift the bar when the paper-carriage is moved in the reverse direction to reset it, substantially as described.

19. In a type-writing machine, the combination with a carriage rack-bar movable transversely of its length, of the spring-pressed plate $V^3$ pivoted on the frame on an axis at right angles to the plane of the rack and lying in or substantially in the plane of and coacting with the teeth of the rack to move the rack transversely of its length during retraction of the carriage, substantially as described.

20. The combination, with the rack-bar $A^3$, of the plate $H^4$ having the vertical rear portion and the horizontal upper portion engaging the bar $A^3$, the plate $L^4$ secured at its rear edge to the plate $H^4$ and bearing at its forward edge against the under side of the bar $A^3$, the screw $M^4$ passed upward through the plate $L^4$ into the plate $H^4$, and the spring $N^4$ interposed between the head of the screw $M^4$ and the under surface of the plate $L^4$, with a trip-arm carried by said plate $H^4$, a gong and its striker, as and for the purpose described.

21. The combination of a main frame carrying the type-operating mechanism and the universal bar, a backwardly and forwardly moving frame carrying a laterally-movable paper-carriage, letter-spacing mechanism carried part by said moving frame and part by said carriage, a rod projecting vertically from the universal bar and provided with a lateral projection adjacent said moving frame, a horizontally-moving plate or bar on said moving frame and adapted to be moved into and out of the vertical path of said projection in all positions of the moving frame, and an arm or projection upon the paper-carriage adapted to actuate such plate or bar and move the same beneath said projection to lock the type-operating mechanism, substantially as described.

22. In a type-writing machine, the combination with the laterally-movable paper-carriage, key-levers, and a universal bar coöperating with said levers, a rod projecting vertically from said bar and provided at its upper end with a lateral projection or head, a pivoted locking bar or plate adapted to be swung under said head, a projection on the carriage for so swinging said bar, and means for sliding or moving said bar longitudinally of itself to withdraw it from engagement with the head and allow the projection or part on the carriage to pass by said bar, and a spring for swinging and moving said bar to a normal position as soon as it is clear of the projection or part upon the carriage, substantially as described.

23. The combination, with the paper-carriage, and the key-levers A and the universal bar $M^3$ coöperating therewith, of the rod $U^4$ projecting vertically from the bar $M^3$ and provided at its upper end with the lateral projection, the plate $P^4$ adapted to be moved into and out of the path of the projection upon the upper end of the rod $U^4$, a projection upon the paper-carriage adapted to coöperate with the plate $P^4$ and move it beneath the upper end of the rod $U^4$, and the lever $S^4$ for withdrawing the plate $P^4$ from the path of the projection upon the paper-carriage, for the purpose described.

24. The combination, with the paper-carriage, and the key-levers A and universal bar $M^3$ coöperating therewith, of the rod $U^4$ projecting vertically from the universal bar $M^3$ and provided with a lateral projection at its upper end, the plate $P^4$, movable into and out of the path of such projection and provided with the lug $O^4$, the adjustable plate $H^4$ mounted upon the rack-bar of the paper-carriage, the arm $I^4$ carried by the plate $H^4$ and coöperating with the lug $O^4$ of the plate $P^4$, and the lever $S^4$ connected to the plate $P^4$ for withdrawing its lug $O^4$ from the path of the arm $I^4$, for the purpose described.

25. The combination, with the laterally-movable paper-carriage, of the two parallel plates $A^5$ $B^5$ located at the right-hand end of the path of the paper-carriage, the plate $A^5$ being secured in fixed position beneath the carriage and the plate $B^5$ being capable of slight longitudinal adjustment, the plate $E^5$ guided between the plates $A^5 B^5$, and the latch $D^5$ pivoted upon the plate $E^5$ and provided with teeth coöperating with teeth upon the inner edge of the plate $B^5$, said latch $D^5$ constituting a stop coöperating with a projection upon the paper-carriage to limit the movement of the latter, substantially as described.

26. The combination, with the laterally-movable paper-carriage, of the two parallel plates $A^5 B^5$ located at the right-hand end of the path of the paper-carriage, the plate $A^5$ being secured in fixed position beneath the carriage and the plate $B^5$ being capable of slight longitudinal adjustment, the plate $E^5$ guided between the plates $A^5 B^5$, and provided with an index or pointer $D^5$ coöperating with a scale upon the plate $A^5$, and the latch $D^5$ pivoted upon the plate $E^5$ and provided with teeth coöperating with teeth upon the inner edge of the plate $B^5$, said latch $D^5$ constituting a stop coöperating with a projection upon the paper-carriage to limit the movement of the latter, substantially as described.

27. In a type-writing machine, the combination with a paper-carriage, and an adjustable marginal stop located at the right-hand end of and beneath its plane of travel, of a stop arm or projection pivoted on said carriage on a horizontal axis and extending below the carriage to coact with said marginal stop and limit the return movement of the paper-carriage, and means for lifting said arm or projection to pass over said marginal stop, substantially as described.

28. In a type-writing machine, the combination with a paper-carriage, and an adjustable marginal stop located at the right-hand end of and beneath its plane of travel, of a stop arm or projection pivoted to said carriage on a horizontal axis and extending beneath the said carriage to coact with said stop and limit the return movement of the paper-carriage, and a push-rod on said carriage coöperating with said stop-arm to lift it to pass over said marginal stop, substantially as described.

29. In a type-writing machine, the combination with a paper-carriage, and an adjustable marginal stop located at the right-hand end of and beneath its plane of travel, of a stop arm or projection pivoted upon said carriage on a horizontal axis and adapted to coact with said stop to limit the return movement of the carriage, and a spring-pressed push-rod borne by said carriage and pivotally connected to said stop-arm for lifting the same to pass over said marginal stop, substantially as described.

30. The combination, with the paper-carriage and an adjustable marginal stop located at the right-hand end of its path of travel, of the movable projection $H^5$ upon the paper-carriage, adapted to contact with said stop and limit the return movement of the paper-carriage, and the spring-pressed endwise-movable releasing-rod $I^5$ coöperating with said movable projection to throw it out of line with the marginal stop, for the purpose described.

JASON C. LOTTERHAND.

Witnesses:
W. H. McFARLAND,
A. H. WAGNER.